United States Patent
Kajino

(10) Patent No.: US 6,966,411 B2
(45) Date of Patent: Nov. 22, 2005

(54) VALVE STRUCTURE OF HYDRAULIC SHOCK ABSORBER FOR VEHICLE

(75) Inventor: Tsutomu Kajino, Shizuoka (JP)

(73) Assignee: Showa Corporation, Saitama (JP)

(*) Notice: Subject to any disclaimer, the term of this patent is extended or adjusted under 35 U.S.C. 154(b) by 0 days.

(21) Appl. No.: 10/722,233

(22) Filed: Nov. 25, 2003

(65) Prior Publication Data

US 2004/0211633 A1    Oct. 28, 2004

(30) Foreign Application Priority Data

Apr. 25, 2003  (JP) ............................. 2003-122851

(51) Int. Cl.[7] ............................................. F16F 9/348
(52) U.S. Cl. ................................. 188/282.5; 188/322.15
(58) Field of Search .......................... 188/282.1, 282.4, 188/282.5, 282.6, 282.8, 282.9, 322.13, 322.15

(56) References Cited

U.S. PATENT DOCUMENTS 4,512,447 A * 4/1985 Miura ...................... 188/282.6

FOREIGN PATENT DOCUMENTS

| DE | 19615587 A1 | * 10/1997 | ............. F16F 9/34 |
| JP | 497133 | 8/1992 | |
| JP | 11082597 A | * 3/1999 | ........... F16F 9/348 |

* cited by examiner

*Primary Examiner*—Xuan Lan Nguyen

(57) ABSTRACT

In a valve structure of a hydraulic shock absorber for a vehicle structured by laminating a first leaf valve, a small-diameter leaf valve and a plurality of second leaf valves, an inner leaf valve is provided between a plurality of second leaf valves. An annular outer leaf valve having a larger thickness than that of the inner leaf valve is provided in an outer peripheral side of the inner leaf valve.

6 Claims, 6 Drawing Sheets

VALVE STRUCTURE OF HYDRAULIC SHOCK ABSORBER FOR VEHICLE

BACKGROUND OF THE INVENTION

1. Field of the Invention

The present invention relates to a valve structure of a hydraulic shock absorber for a vehicle.

2. Description of the Related Art

There has been known a hydraulic shock absorber which is interposed between a vehicle body and an axle in a vehicle, and cushions an impact applied to the vehicle from a road surface.

A standard valve apparatus of the conventional hydraulic shock absorber is structured, as shown in FIG. 3B, such that a first leaf valve 2 is provided in an opening portion of a flow passage 1A arranged in a partition wall member 1 constituted by a piston sectioning an oil chamber. A small-diameter leaf valve 3 (an intermediate sheet) is provided on an opposite side of the first leaf valve 2 to a side facing the partition wall member 1. A plurality of second leaf valves 4 are provided in an opposite side of the small-diameter leaf valve 3 to the side facing the first leaf valve 2. The leaf valves 2, 3 and 4 are laminated on the partition wall member 1 by fixing inner peripheral sides of the respective leaf valves 2, 3 and 4 by a washer 5 and a nut 6. An annular gap is provided in an outer peripheral side of the small-diameter leaf valve 3, between the first leaf valve 2 and the second leaf valve 4. A damping force property B obtained by the standard valve structure in FIG. 3B, causes the changes of an expansion side damping force Ft with respect to a piston speed Vp and an expansion side damping force Fc being linear, as shown in FIG. 4. Accordingly, a soft ride quality can be obtained by reducing damping force in a low speed range. However, the damping force in a middle speed range can not be made appropriately high, and vehicle body pitching control is not good in the middle speed range.

A preset valve structure of the hydraulic shock absorber described in Japanese Utility Model Application Laid-Open No. 4-97133 (reference document 1) is structured, as shown in FIG. 3C, such that the number of the leaf valve 2 in the standard valve structure is set to a plural number. An inner leaf valve 7 is provided between a plurality of first leaf valves 2, and an annular outer leaf valve 8 having a larger thickness than that of the inner leaf valve 7 is provided in an outer peripheral side of the inner leaf valve 7. In accordance with the preset valve structure in FIG. 3C, the first leaf valve 2 on a side of the small-diameter leaf valve 3 is previously deflected at the amount that the outer leaf valve 8 is thicker than the inner leaf valve 7. A preset load in accordance with the previous deflection is applied to the first leaf valve 2 on the side of the partition wall member 1. A damping force property C having a high damping force is exhibited as shown in FIG. 4. It is possible to set the damping force in the middle speed range appropriately high, and it is possible to improve the vehicle body pitching control in the middle speed range.

In accordance with the preset valve structure of the hydraulic shock absorber described in the reference document 1, the preset load generated by the deflection of the first leaf valve 2 on the side opposite to the piston is applied to the first leaf valve 2 on the side of the piston (on the side of the partition wall member 1) from an initial stage of the low speed range. The damping force in the low speed range becomes excessive, thereby deteriorating ride quality.

SUMMARY OF THE INVENTION

The object of the present invention is to keep the damping force in the low speed range low so as to obtain a comfortable ride quality, and to make the damping force in the middle speed range appropriately high so as to improve vehicle body pitching control.

The present invention relates to a valve structure of a hydraulic shock absorber for a vehicle. A first leaf valve is provided in an opening portion of a flow passage arranged in a partition wall member sectioning an oil passage. A small-diameter leaf valve is provided on an opposite side of the first leaf valve to the partition wall member. A plurality of second leaf valves are provided on an opposite side of the small-diameter leaf valve to the first leaf valve. An annular gap is provided on an outer peripheral side of the small-diameter leaf valve, between the first leaf valve and the second leaf valve. The respective leaf valves are fixed in inner peripheral sides thereof so as to be laminated on the partition wall member. An inner leaf valve is provided between a plurality of second leaf valves, and an annular outer leaf valve having a larger thickness than that of the inner leaf valve is provided in an outer peripheral side of the inner leaf valve.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 3A to 3C show a preset valve structure, in which FIG. 3A is a schematic view showing a preset valve structure in accordance with an embodiment of the present invention. FIG. 3B is a schematic view showing a standard valve structure in accordance with the prior art, and FIG. 3C is a schematic view showing a preset valve structure in accordance with the prior art;

DESCRIPTION OF THE PREFERRED EMBODIMENTS

Figure 1:
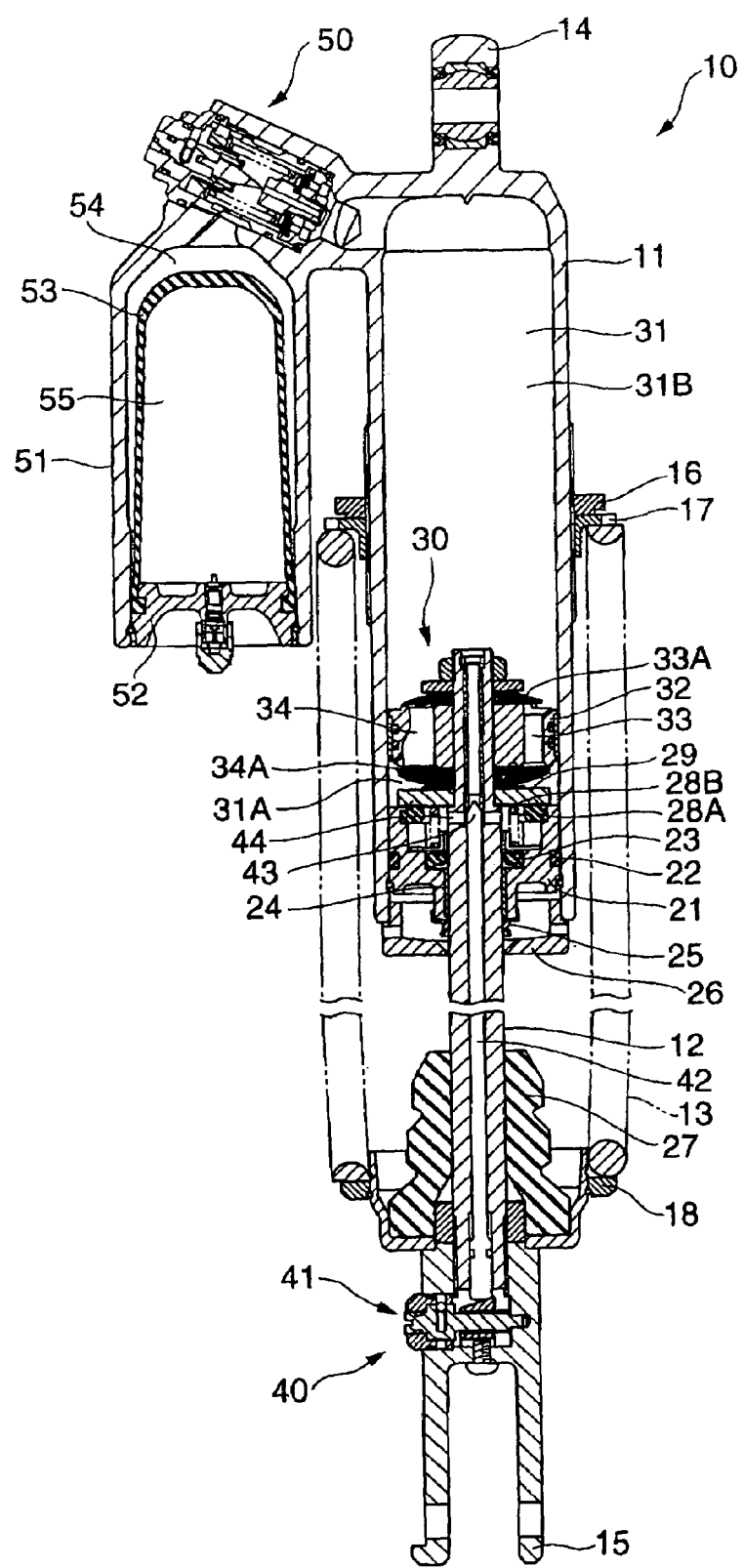
FIG. 1 is a cross sectional view showing a hydraulic shock absorber.

A hydraulic shock absorber 10 is structured, as shown in FIG. 1, such that a hollow piston rod 12 is inserted into a damper cylinder 11, and a suspension spring 13 is interposed between the damper cylinder 11 and an outer side portion of the piston rod 12.

The damper cylinder 11 is provided with a vehicle body side mounting portion 14, and the piston rod 12 is provided with an axle side mounting portion 15. A spring receiver adjusting ring 16 and a spring receiver 17 are screwed to an outer peripheral portion of the damper cylinder 11. A spring receiver 18 is fixed to the piston rod 12. The suspension spring 13 is interposed between the spring receiver 17 and the spring receiver 18, and a set length of the suspension spring 13 can be adjusted by a spiral motion of the spring adjusting ring 16 and the spring receiver 17. An elastic force of the suspension spring 13 absorbs impact applied to the vehicle from a road surface.

The damper cylinder 11 is provided with a rod guide 21 through which the piston rod 12 extends. The rod guide 21 is inserted and attached to the damper cylinder 11 via an O-ring 22 in a liquid tight manner, and freely slides the piston rod 12 along an inner diameter portion provided with an oil seal 23, a bush 24 and a dust seal 25.

In this case, the damper cylinder 11 is provided with a bumper stopper 26 in an outer side of the rod guide 21. A compression side bumper 27 provided in the piston rod 12 is brought into contact with the bumper stopper 26 so as to control a minimum compression stroke. Further, the damper cylinder 11 is provided with a rebound rubber 28A and a rebound spring 28B in an inner end surface of the rod guide 21. A rebound stopper 29 provided in the piston rod 12 is brought into contact with a rebound rubber 28A and a rebound spring 28B so as to control an extended stroke.

The hydraulic shock absorber 10 has a piston valve apparatus 30 (an expansion side damping force generating apparatus), and a base valve apparatus 50 (a compression side damping force generating apparatus). The hydraulic shock absorber 10 controls an expansion and contraction vibration of the damper cylinder 11 and the piston rod 12 generated in accordance with the absorption of the impact force generated by the suspension spring 13, based on the damping force generated by the piston valve apparatus 30 and the base valve apparatus 50.

Piston Valve Apparatus 30—FIG. 1

The hydraulic shock absorber 10 is structured such that an oil chamber 31 is formed within the damper cylinder 11. The oil chamber 31 is sectioned into a rod side oil chamber 31A receiving the piston rod 12 and a piston side oil chamber 31B receiving piston rod 12 by a piston 32 provided in a leading end portion of the piston rod 12 slidably inserted into the damper cylinder 11. The piston valve apparatus 30 is provided in the piston 32.

The piston valve apparatus 30 is structured such that the piston 32 is provided with an expansion side flow passage 33 and a compression side flow passage 34 which correspond to a communication path of the rod side oil chamber 31A and the piston side oil chamber 31B. The expansion side flow passage 33 and the compression side flow passage 34 are respectively provided with an expansion side disc valve 33A and a compression side disc valve 34A. In the piston valve apparatus 30, an expansion side damping force based on a deflection deformation of the expansion side disc valve 33A is set to be larger than a compression side damping force based on a deflection deformation of the compression side disc valve 34A.

The piston valve apparatus 30 is accessorily provided with a damping force adjusting apparatus 40. The damping force adjusting apparatus 40 is structured such that a bypass flow passage 44 constituted by a horizontal hole open to the rod side oil chamber 31A and a vertical hole open to the piston side oil chamber 31B is formed in the piston rod 12. A damping force adjusting rod 42 operated by the slider apparatus 41 is internally inserted to the piston rod 12 so as to freely move forward and backward. An opening area of the bypass flow passage 44 is adjusted by a needle valve 43 in a leading end of the damping force adjusting rod 42.

Accordingly, during a compression stroke of the hydraulic shock absorber 10, oil in the piston side oil chamber 31B opens the compression side disc valve 34A through the compression side flow passage 34 so as to be introduced to the rod side oil chamber 31A.

During an expansion stroke of the hydraulic shock absorber 10, when the relative speed between the damper cylinder 11 and the piston rod 12 is low, the oil in the rod side oil chamber 31A flows to the piston side oil chamber 31B through the bypass flow passage 44 having the needle valve 43. An expansion side damping force is generated by a throttle resistance by the needle valve 43 therebetween. The damping force is adjusted by a rotating operation of the slider apparatus 41.

During an expansion stroke of the hydraulic shock absorber 10, oil in the rod side oil chamber 31A deflection deforms the expansion side disc valve 33A through the expansion side flow passage 33 so as to be introduced to the piston side oil chamber 31B, thereby generating the expansion side damping force.

Figure 2:
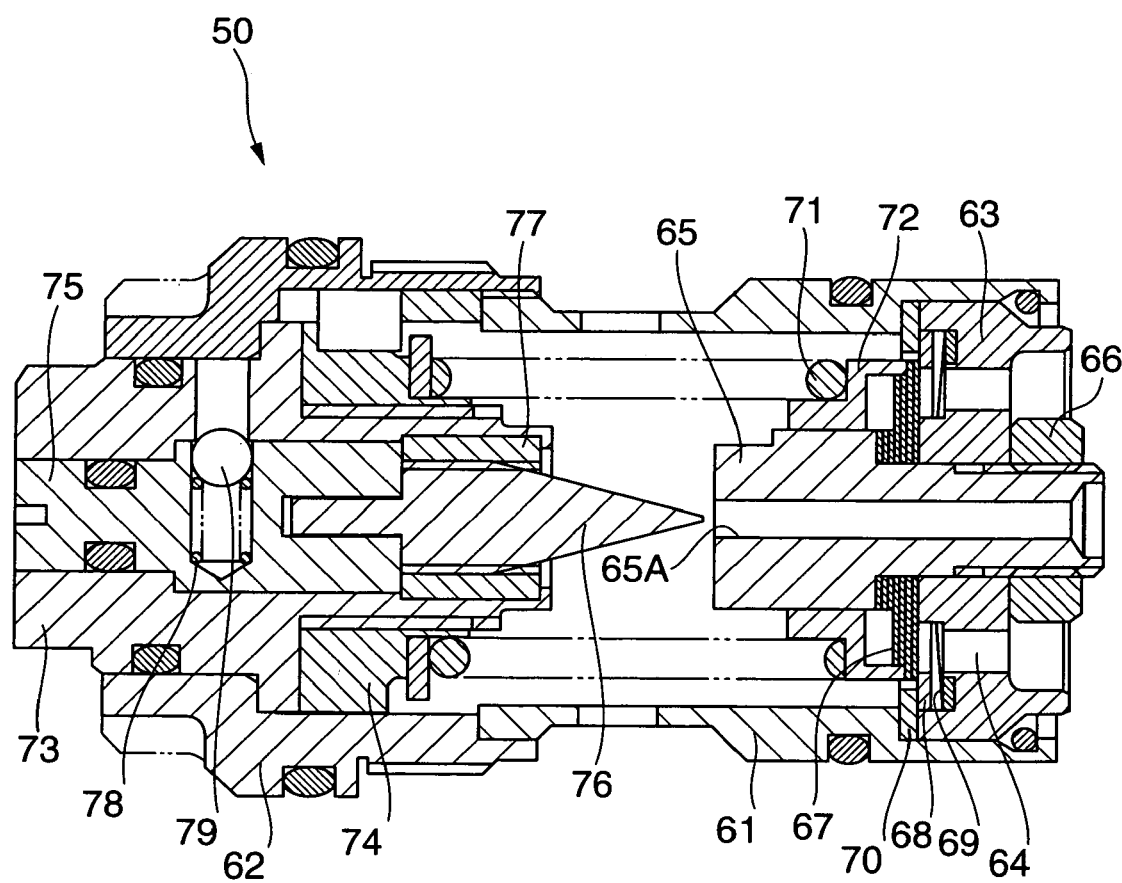
FIG. 2 is a cross sectional view showing a base valve apparatus.

Base Valve Apparatus 50—FIGS. 1 and 2

The base valve apparatus 50 is structured such that a reservoir 51 is integrally formed with the damper cylinder 11, and the interior of the reservoir 51 sealed by a cap 52 is sectioned into an oil chamber 54 and a gas chamber 55 by a partition wall member 53 of a diaphragm type. A free piston type may be employed.

The base valve apparatus 50 is structured, as shown in FIG. 2, such that a valve housing 61 is provided in a communication area between the piston side oil chamber 31B of the damper cylinder 11 and the oil chamber 54 of the reservoir 51. The valve housing 61 is fixed by a plug bolt 62 screwed to the damper cylinder 11. A piston 63 is fixed to the valve housing 61, and a flow passage 64 is provided in the piston 63. A bypass forming bolt 65 is fixed to a center portion of the piston 63 by a nut 66. Around the center portion of the bypass forming bolt 65, there is provided a compression side valve 67 making the flow passage 64 open during compression. An expansion side valve 68 (a check valve) conducts the flow passage 64 during expansion, and a valve spring 69 supports the expansion side valve 68 by a back surface. Reference numeral 70 denotes a valve seat. Further, a valve receiver 72 which is energized by a spring 71 and which applies an initial load to the compression side valve 67 is attached to the bypass forming bolt 65.

The base valve apparatus 50 is structured such that an adjust lever 73 is rotatably fitted to the plug bolt 62 in a liquid tight manner, and an adjust guide 74 is screwed to a threaded portion of the adjust lever 73. The structure is made such that the adjust guide 74 is moved in an axial direction by rotating the adjust lever 73, so that it is possible to adjust an initial set length of the spring 71 in the compression side valve 67, as an initial load.

The base valve apparatus 50 is structured such that a adjust rod 75 is rotatably attached to the adjust lever 73. A leading end portion of the adjust rod 75 is provided with a needle valve 76 which can be engaged in a rotation direction and can be moved relatively in an axial direction. An outer peripheral threaded portion of the needle valve 76 is screwed to a nut 77 which is caulked and fixed to the leading end side of the adjust lever 73. The needle valve 76 can be moved forward and backward with respect to the bypass flow passage 65A of the bypass forming bolt 65. An opening area of the bypass flow passage 65A can be adjusted by rotating the adjust rod 75 by a tool engaged with an operation groove in the adjust rod 75, engaging a ball 79 energized by the spring 78 with each of engagement recess portions arranged, uniformly, at a plurality of positions in a peripheral direction of the adjust lever 73 in sequence, and setting the adjust rod 75 to any one of the rotation operating positions.

Accordingly, during compression of the hydraulic shock absorber 10, oil in correspondence to a volumetric capacity of forward movement of the piston rod 12 which moves forward to the damper cylinder 11 is discharged to the oil chamber in the reservoir 51 through the bypass flow passage 65A of the bypass forming bolt 65 or the flow passage 64 of the piston 63 from the piston side oil chamber 31B. At this time, when the relative speed between the damper cylinder 11 and the piston rod 12 is low, it is possible to obtain the compression side damping force based on the throttle resistance applied by the needle valve 76 provided in the bypass flow passage 65A. Further, when the relative speed between the damper cylinder 11 and the piston rod 12 is at middle or high speeds, the oil flowing through the flow passage 64 from the piston side oil chamber 31B deflect deforms the compression side valve 67 so as to be introduced to the oil chamber of the reservoir 51, thereby generating the compression side damping force.

During expansion of the hydraulic shock absorber 10, the oil in correspondence to a volumetric capacity of backward movement of the piston rod 12 which moves backward from the damper cylinder 11 is returned to the piston side oil chamber 31B through the expansion side valve 68 and the flow passage 64 from the oil chamber of the reservoir 51.

Figure 3A:
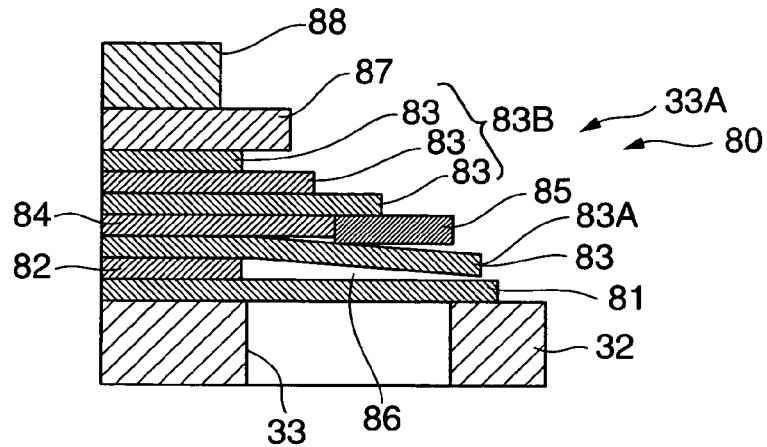
Figure 3B:
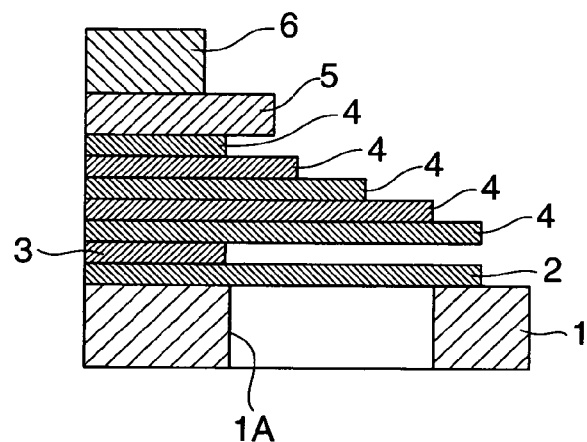
Figure 3C:
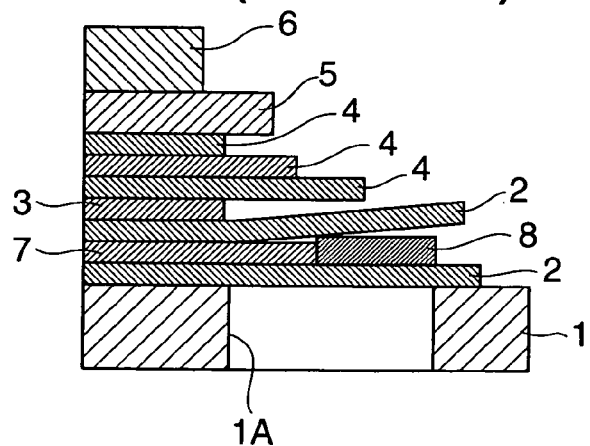
Figure 4:
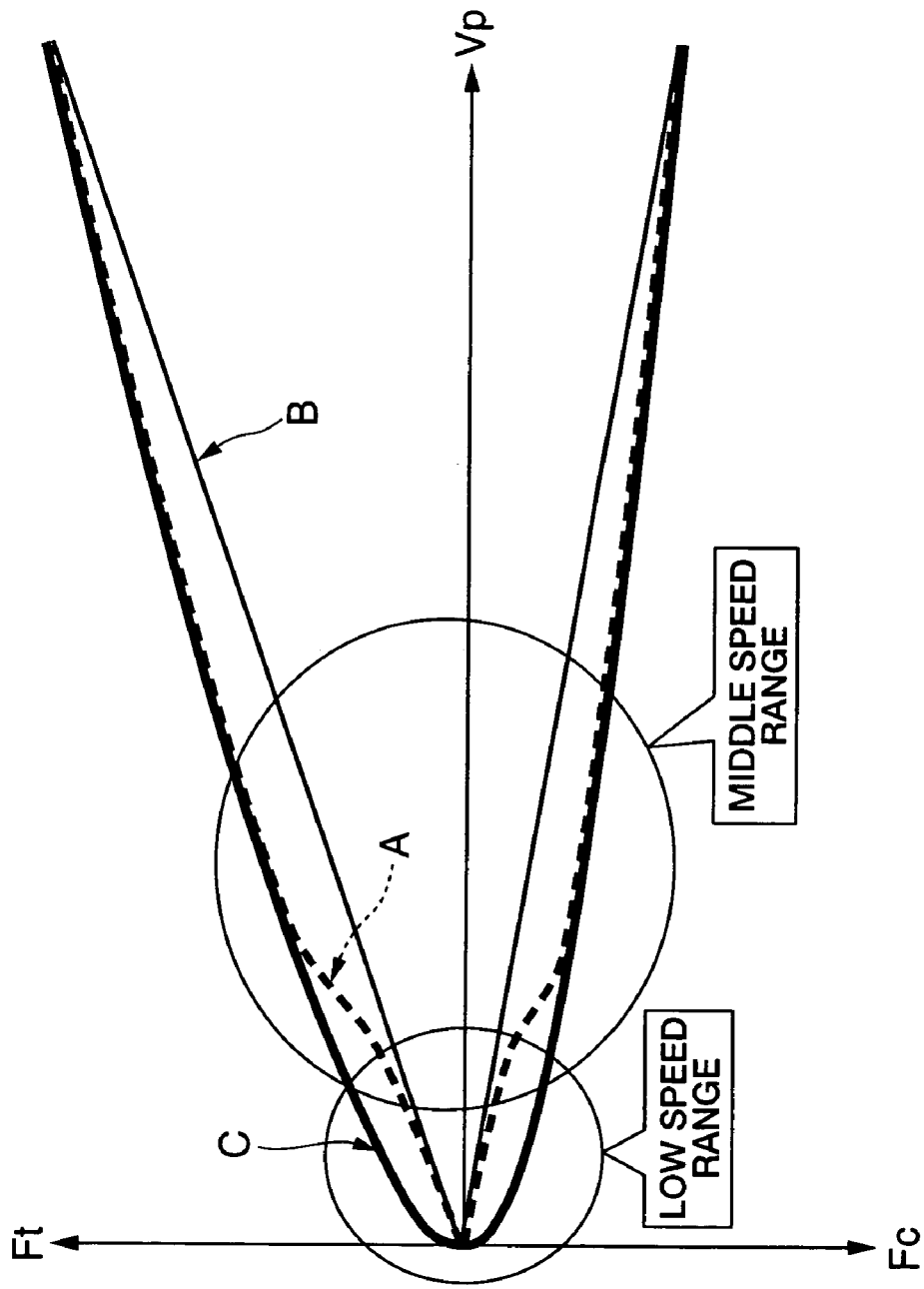
FIG. 4 is a graph of a damping force property.

Accordingly, in the hydraulic shock absorber 10, the expansion side disc valve 33A of the piston valve apparatus 30 is structured by the following preset valve structure 80, FIGS. 3A and 4.

The preset valve structure 80 of the expansion side disc valve 33A is structured, as shown in FIG. 3A, such that a first leaf valve 81 is provided in the opening portion of the expansion side flow passage 33 arranged in the piston 32. A small-diameter leaf valve 82 is provided in an opposite side of the first leaf valve 81 to the piston 32, and a plurality of second leaf valves 83 are provided on an opposite side of the small-diameter leaf valve 82 to the first leaf valve 81. An inner leaf valve 84 having a larger outer diameter than that of the small-diameter leaf valve 82 is provided between a plurality of second leaf valves 83. An annular outer leaf valve 85 having a larger thickness than that of the inner leaf valve 84 is provided in an outer periphery of the inner leaf valve 84 via no gap. An annular gap 86 is provided in an outer periphery of the small-diameter leaf valve 82 between the first leaf valve 81 and the second leaf valve 83. The piston rod 12 is inserted and attached to a center hole of each of the leaf valves 81 to 85. An inner peripheral side of each of the leaf valves 81 to 85 is fixed to the piston rod 12 on the piston 32 by a washer 87 and a nut 88, and the leaf valves 81 to 85 are laminated on the piston 32.

In this case, an outer diameter of the small-diameter leaf valve 82 is set at a dimension approximately equal to or smaller than the distance from the center of the piston 32 to the expansion side flow passage 33. The second leaf valve 83 laminated on the piston 32 is structured such as to be elastically deformed around an outer edge of the small-diameter leaf valve 82 corresponding to a supporting point.

In the second leaf valve 83A in the side of the small-diameter leaf valve 82 and the second leaf valve 83B on the side of the washer 87 which clamp the inner leaf valve 84 and the outer leaf valve 85, the second leaf valve 83A in the side of the small-diameter leaf valve 82 is structured such as to be easily deflected at a degree such that the outer leaf valve 85 is thicker than the inner leaf valve 84. In accordance with the present embodiment, the second leaf valve 83A is constituted by one leaf valve, and the second leaf valve 83B is constituted by a plurality of leaf valves. The structure is thereby made such that the second leaf valve 83A is easily deflected.

In accordance with the present embodiment, the following operations and effects can be obtained.

In the preset valve structure 80 of the hydraulic shock absorber 10, the inner leaf valve 84 is provided between a plurality of second leaf valves 83. The annular outer leaf valve 85 having a larger thickness than that of the inner leaf valve 84 is provided in the outer peripheral side of the inner leaf valve 84. The second leaf valve 83A on the side of the small-diameter leaf valve 82 is previously deflected to the side of the annular gap 86 on the outer peripheral side of the small-diameter leaf valve 82 at a degree such that the outer leaf valve 85 is thicker than the inner leaf valve 84. However, a previously deflecting leading end portion of the second leaf valve 83A is set so as not to support the first leaf valve 81 by the back surface at the low speed range, FIG. 3A. In the middle speed range, the first leaf valve 81 is brought into contact with the previously deflecting leading end portion mentioned above of the second leaf valve 83A so as to be supported by the back surface after the first leaf valve 81 gets over a certain deflection amount from the start of deflection of the first leaf valve 81 in the low speed range. The preset load generated by the pre-deflection of the second leaf valve 83A is applied to the first leaf valve 81.

Accordingly, a damping property A of the preset valve structure 80 is made such that in the low speed range of the hydraulic shock absorber 10, the first leaf valve 81 is not exposed to the preset load caused by the pre-deflection of the second leaf valve 83 (83A). The damping force is thereby set low, and a comfortable ride quality can be obtained, as shown in FIG. 4.

In the middle speed range of the hydraulic shock absorber 10, the first leaf valve 81 is exposed to the preset load caused by the pre-deflection of the second leaf valve 83 (83A), whereby the damping force is set high, and vehicle body pitching control can be improved.

Figure 5:
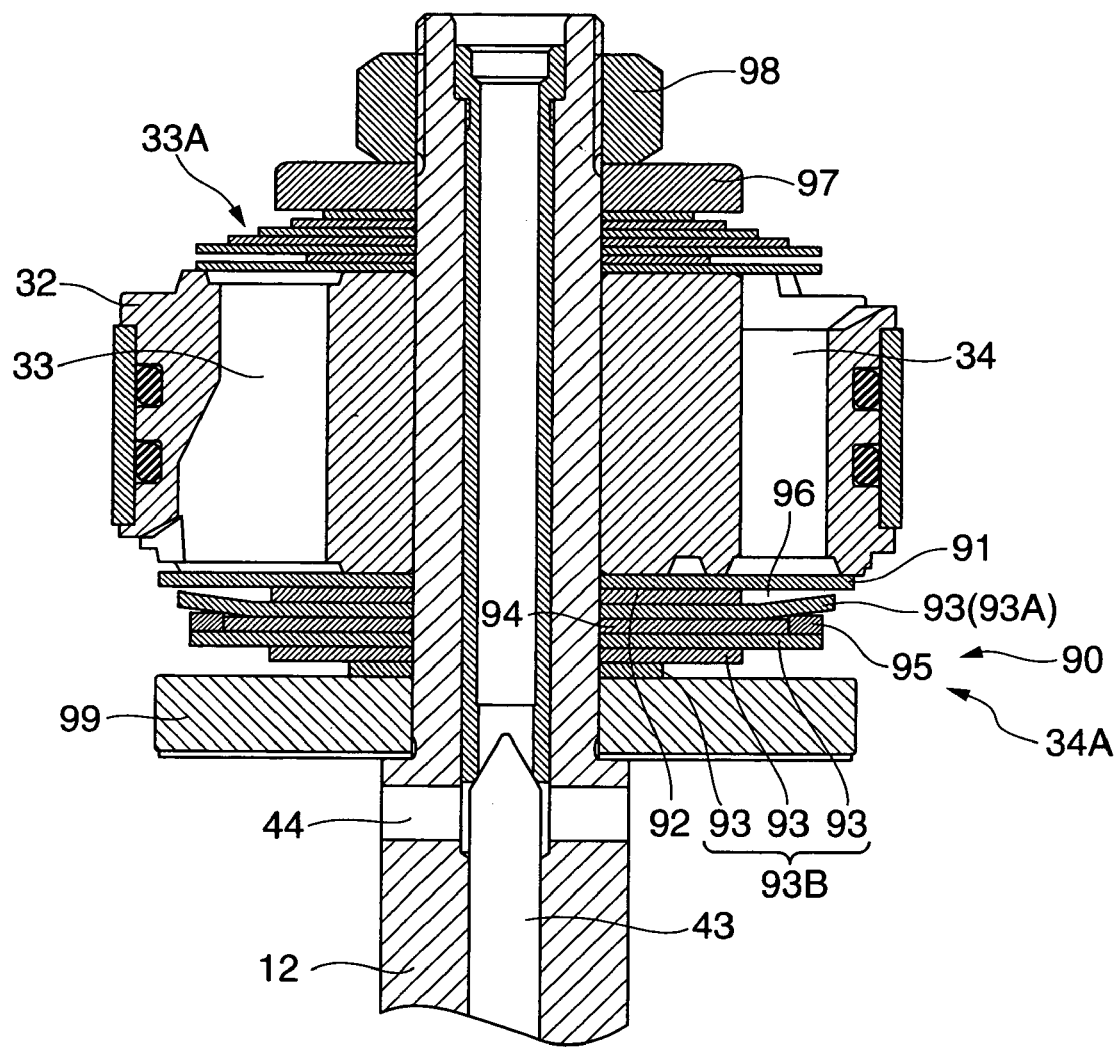
FIG. 5 is a cross sectional view showing a modified example of the preset valve structure.

FIG. 5 shows a modified example structured such that a preset valve structure 90 in accordance with the present invention is applied to the compression side disc valve 34A of the piston valve apparatus 30, in the hydraulic shock absorber 10.

The preset valve structure 90 of the compression side disc valve 34A is structured such that a first leaf valve 91 is provided in the opening portion of the compression side flow passage 34 arranged in the piston 32. A small-diameter leaf valve 92 is provided on an opposite side of the first leaf valve 91 to the piston 32, and a plurality of second leaf valves 93 are provided on opposite side of the small-diameter leaf valve 92 to the first leaf valve 91. An inner leaf valve 94 having a larger outer diameter than that of the small-diameter leaf valve 92 is provided between a plurality of second leaf valves 93. An annular outer leaf valve 95 having a larger thickness than that of the inner leaf valve 94 is provided in an outer periphery of the inner leaf valve 94 with no gap. An annular gap 96 is provided in an outer periphery of the small-diameter leaf valve 92 between the first leaf valve 91 and the second leaf valve 93. The piston rod 12 is inserted and attached to a center hole of each of the leaf valves 91 to 95. An inner peripheral side of each of the leaf valves 91 to 95 is clamped between the piston 32 and a valve stopper 99 by a washer 97 and a nut 98 so as to be fixed to the piston rod 12. The leaf valves 91 to 95 are laminated on the piston 32.

In this case, the structure is made such that an outer diameter of the small-diameter leaf valve 92 is set to be equal to or smaller than the distance from the center of the piston 32 to the compression side flow passage 34. The second leaf valve 93 laminated on the piston 32 is elastically deformed around an outer edge of the small-diameter leaf valve 92 corresponding to a supporting point.

Further, in the second leaf valve 93A on the side of the small-diameter leaf valve 92 and the second leaf valve 93B on the side of the washer 97 which clamp the inner leaf valve 94 and the outer leaf valve 95, the second leaf valve 93A on the side of the small-diameter leaf valve 92 is structured such as to be easily deflected at a degree such that the outer leaf valve 95 is thicker than the inner leaf valve 94. In accordance with the present embodiment, the second leaf valve 93A is constituted by one leaf valve, and the second leaf valve 93B is constituted by a plurality of leaf valves. The structure is thereby made such that the second leaf valve 93A is easily deflected.

In accordance with the present embodiment, the following operations and effects can be obtained.

In the preset valve structure 90 of the hydraulic shock absorber 10, the inner leaf valve 94 is provided between a plurality of second leaf valves 93, and the annular outer leaf valve 95 having a larger thickness than that of the inner leaf valve 94 is provided in the outer peripheral side of the inner leaf valve 94. The second leaf valve 93A on the side of the small-diameter leaf valve 92 is previously deflected to the side of the annular gap 96 in the outer peripheral side of the small-diameter leaf valve 92 at a degree such that the outer leaf valve 95 is thicker than the inner leaf valve 94. However, a previously deflecting leading end portion of the second leaf valve 93A is set so as not to support the first leaf valve 91 by the back surface at the low speed range, FIG. 5. In the middle speed range in which the first leaf valve 91 is brought into contact with the previously deflecting leading end portion mentioned above of the second leaf valve 93A so as to be supported by the back surface after the first leaf valve 91 gets over a certain deflection amount from the start of deflection of the first leaf valve 91 in the low speed range, the preset load generated by the pre-deflection of the second leaf valve 93A is applied to the first leaf valve 91.

Accordingly, a damping property A of the preset valve structure 90 is arranged such that in the low speed range of the hydraulic shock absorber 10, the first leaf valve 91 is not exposed to the preset load caused by the pre-deflection of the second leaf valve 93 (93A). The damping force is thereby set low, and a comfortable ride quality can be obtained, as shown in FIG. 4.

In the middle speed range of the hydraulic shock absorber 10, the first leaf valve 91 is exposed to the preset load caused by the pre-deflection of the second leaf valve 93 (93A). The damping force is set high, and the vehicle body pitching control can be improved.

Figure 6:
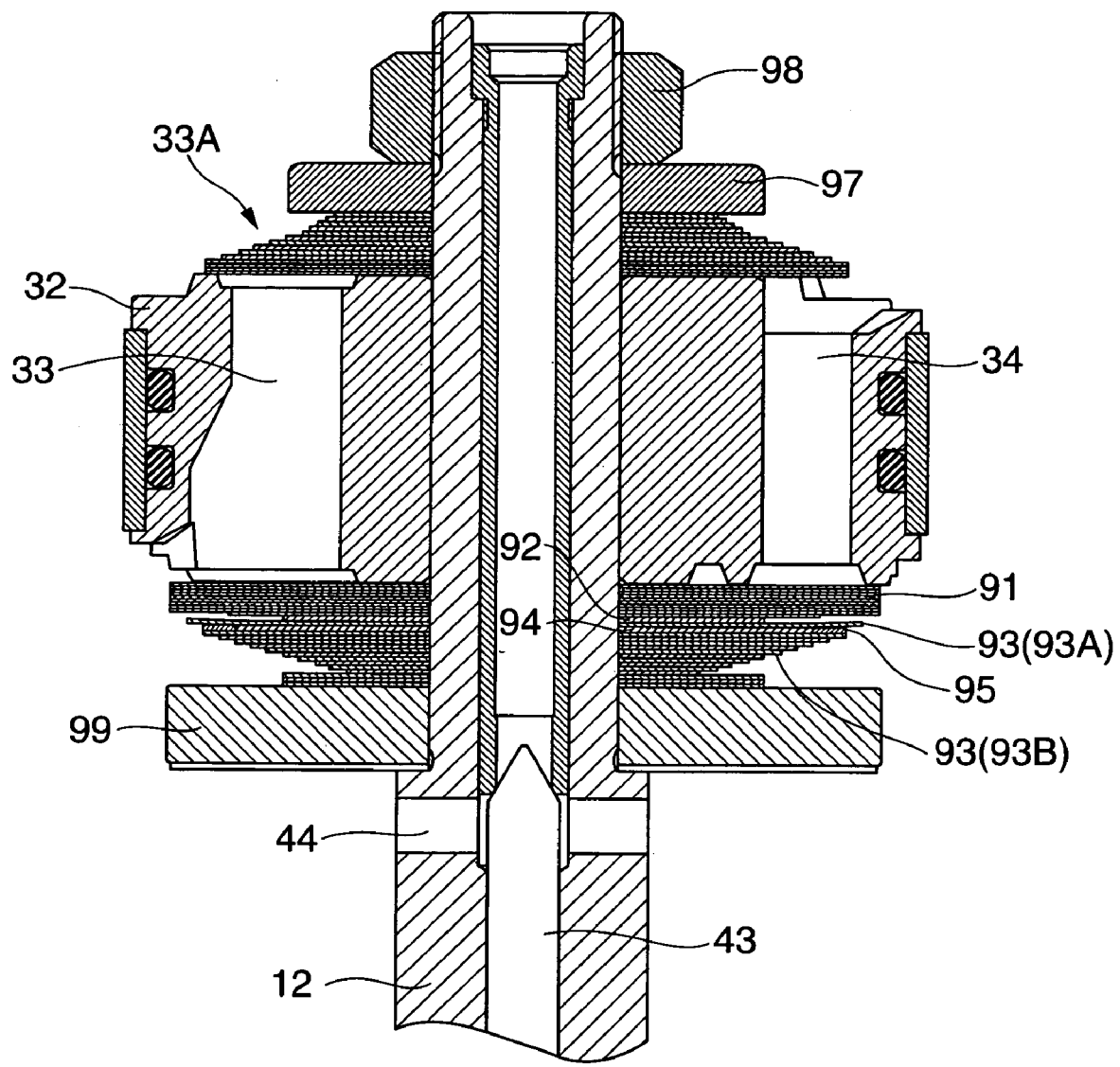
FIG. 6 is a cross sectional view showing a modified example of the preset valve structure.

FIG. 6 shows a modified example of the preset valve structure 90 of the compression side disc valve 34A mentioned above, in which the first leaf valve 91 is structured by a plurality of leaf valves.

In the present embodiment, the second leaf valve may be formed in a pyramid shape such that a diameter of a plurality of leaf valves becomes smaller step by step as the leaf valves get away from the small-diameter leaf valve, or may be formed such that a plurality of leaf valves have the same diameter, or may be formed, as shown in FIG. 6, such that a group of pyramid-shaped leaf valves and a group of same-diameter leaf valves are provided.

The inner leaf valve and the outer leaf valve may be provided between the optional leaf valves constituting the second leaf valve.

Each of the inner leaf valve and the outer leaf valve may be constituted by a plurality of leaf valves. The small-diameter leaf valve may be constituted by a plurality of leaf valves.

As mentioned above, in accordance with the present invention, it is possible to keep the damping force in the low speed range low so as to obtain a comfortable ride quality, and it is possible to make the damping force in the middle speed range relatively high so as to improve vehicle body pitching control.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the valve structure in accordance with the present invention may be applied to the compression side valve 67 of the base valve apparatus 50.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A valve structure of a hydraulic shock absorber for a vehicle, comprising:
    a first leaf valve provided in an opening portion of a flow passage arranged in a partition wall member sectioning an oil passage;
    a small diameter leaf valve provided in an opposite side of the first leaf valve to the partition wall member;
    a plurality of second leaf valves, all said second leaf valves provided in an opposite side of the small diameter leaf valve to the first leaf valve;
    an annular gap provided in an outer peripheral side of the small diameter leaf valve, between the first leaf valve and the second leaf valve;
    the respective leaf valves being fixed in inner peripheral sides thereof so as to be laminated on the partition wall member,
    an inner leaf valve is disposed between the plurality of second leaf valves, and
    an annular outer leaf valve having a larger thickness than that of the inner leaf valve is disposed on an outer peripheral side of the inner leaf valve,
    wherein the second leaf valve provided between the small diameter leaf valve and the inner leaf valve comprises one leaf valve, and
    the other second leaf valves comprise a plurality of leaf valves.

2. A valve structure of a hydraulic shock absorber for a vehicle according to claim 1, wherein an outer diameter of the small diameter leaf valve is set to be no greater than a distance from a center of the partition wall member to a flow passage provided in the partition wall member.

3. A valve structure of a hydraulic shock absorber for a vehicle according to claim 1, wherein the first leaf valve comprises a plurality of leaf valves.

4. A valve structure of a hydraulic shock absorber for a vehicle according to claim 1, wherein the a plurality of leaf valves of the other second leaf valves have smaller diameters step by step such that the other second leaf valves are formed in a pyramid shape as the second leaf valves depart from the small diameter leaf valve.

5. A valve structure of a hydraulic shock absorber for a vehicle according to claim 1, wherein the plurality of leaf valves of the other second leaf valves have the same diameter.

6. A valve structure of a hydraulic shock absorber for a vehicle according to claim 1, wherein the other second leaf valves comprise:
 a first group of leaf valves having smaller diameters step by step such that the first group is formed in a pyramid shape as the other second leaf valves depart from the small diameter leaf valve, and
 a second group of leaf valves having the same diameter.

* * * * *